M. BAER'S
Seeder & Cultivator.
117361  PATENTED JUL 25 1871
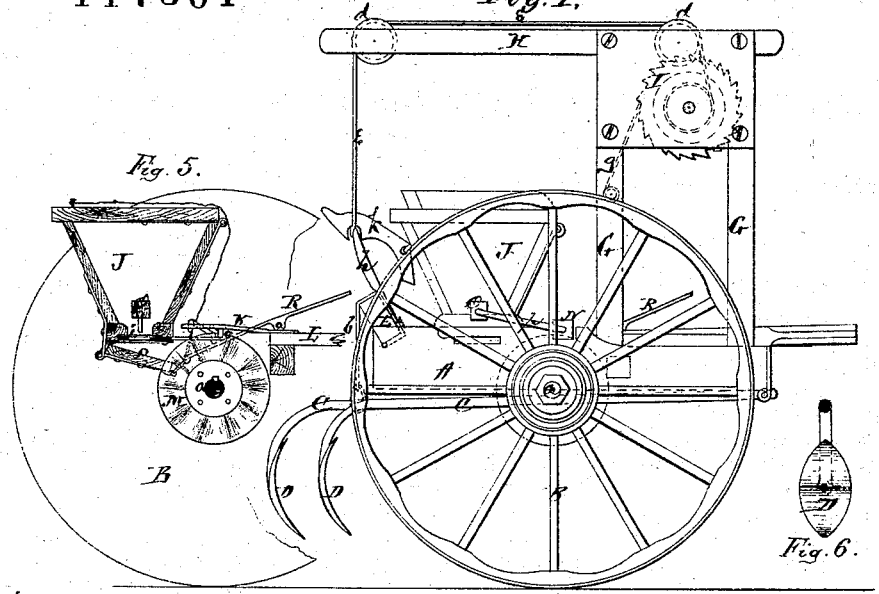
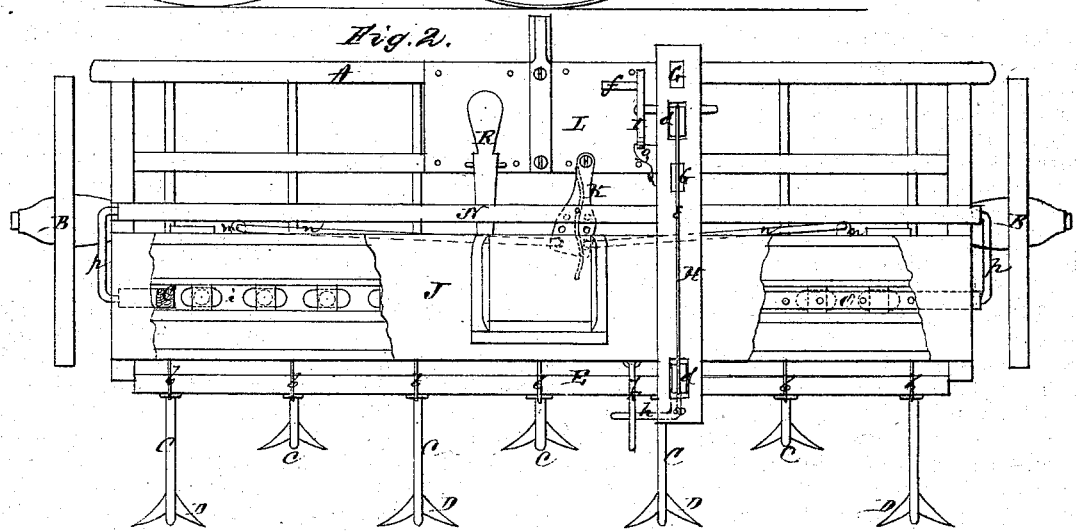
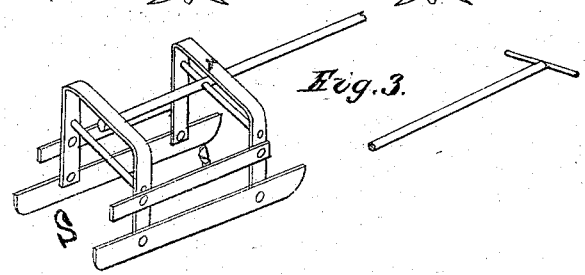
Witnesses
Jno. A. Ellis
J. V. White
Inventor
Michael Baer
Per
T. H. Airyman
Atty
AM. PHOTO-LITHOGRAPHIC CO. N.Y. (OSBORNE'S PROCESS.)

UNITED STATES PATENT OFFICE.

MICHAEL BAER, OF LOGANSPORT, INDIANA.

IMPROVEMENT IN COMBINED SEEDERS AND CULTIVATORS.

Specification forming part of Letters Patent No. 117,361, dated July 25, 1871.

*To all whom it may concern:*

Be it known that I, MICHAEL BAER, of Logansport, in the county of Cass and State of Indiana, have invented certain new and useful Improvements in Combined Seeder and Cultivator; and I do hereby declare that the following is a full, clear, and exact description thereof, reference being had to the accompanying drawing and to the letters of reference marked thereon which form a part of this specification.

The nature of my invention consists in the construction and arrangement of a combined seeder and cultivator, as will be hereinafter fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view of my machine. Fig. 3 is a perspective of an apparatus used for cultivating corn and all plants tilled in rows. Fig. 4 is a view of the bottom of the seed-box used when sowing small seed. Fig. 5 is a transverse vertical section of the machine, and Fig. 6 is a front view of the plow-blade.

A represents the frame of my machine, supported upon the axle $a$, on each end of which is supported a wheel, B. On a rod at the front end of the frame A are pivoted the plow-shanks C C, of the construction shown in Fig. 1, and having at their rear ends the plow-blades D D attached to them. The plow-blades D D are two-pointed, as shown in Fig. 6, being concave on the front side from point to point and cylindrical or rounded from side to side. All the plow-shanks C C are connected by chains or cords $b$ to a bar, E, pivoted within the rear end of the frame A. This bar E is turned on its pivots, so as to raise or lower the plow, by the following means: upon the front portion of the frame A are two standards, G G, connected at their upper ends by a horizontal bar, H, which extends toward the rear, and provided with pulleys $d\ d$. At the upper ends of the standards G G, below the bar H, are suitable bearings for a ratchet-wheel, I, turned by a crank, $f$, and held by a pawl, $g$. On the journal or shaft of said ratchet-wheel is a pulley, around which is wound a cord, $e$, which passes over the pulleys $d\ d$, and its other end attached to an arm, $h$, on the bar E. By turning the wheel I in either direction it will thus be seen that the plows are either raised or lowered. To the wheel I may be attached a gauge, so that the driver may see how deep into the ground the plows are working and regulate them at will. When turning or moving to or from the field the bar E is turned so that the arm $h$ will catch in a hook, $k$, and be held there, also holding the plows up out of the ground. The seed-box J is secured upon the rear end of the frame A, and its bottom perforated in such a manner that there will be two holes for each plow, thereby scattering the seed more than where there is only one outlet for the seed for each plow. The slide $i$, for moving the seed and opening and closing the perforations in the bottom, is provided with two arms, $m\ m$, connected by rods $n\ n$ to a lever, K, which is pivoted on the platform L at the center of the frame A. On the under side of said lever K are two pins, $o$, between which works the edge of a zigzag wheel, M, attached to the axle $a$, thereby moving said lever from side to side and thus operating the slide $i$. On the upper side of the lever K is secured a bar, N, which runs parallel with and is about the same length as the seed-box J. The ends of said bar are, by bent rods $p\ p$, connected with the ends of the rake O, which is thus moved longitudinally from end to end within the seed-box. At the rear edge of the bottom of the seed-box J is hinged a door, P, connected by a chain or other suitable means with a pedal, R, pivoted on the platform L, which door may be made to entirely close the bottom of the seed-box, the driver operating the pedal or foot-lever R when desired. The plows D D, being made two-pointed, can be inverted at pleasure for either point.

In Fig. 4 I have represented a bottom that may be substituted for the one above described in the seed-box. The crevice or opening formed along the bar $i$ may be widened or narrowed by gauge, fastenings, &c., attached thereto. The object of this bottom is to sow large and light seeds, such as oats, barley, &c.

For cultivating corn and all plants tilled in rows the middle plow is taken off and the apparatus S, shown in Fig. 3, is attached thereto, said apparatus passing over the row, forcing mellow and loose soil up to and around stalks, and warding off clods, trash, &c.

From the construction of the machine it will be seen that it may be operated while either riding upon it or while walking behind it.

This machine may also be used for laying out ground to plant all things in straight rows by extending the bar on which the plows are attached at each end a sufficient length, and taking away all plows except one in the middle, and fastening a plow to each end of said extended bar. By this means three furrows may be made at once, or any number desired, by having a sufficiently long bar. A gauge or pointer may be made of some light material and fastened onto end of bar, next to the last or nearest furrow made, to keep the driver a proper distance away from it. Said gauge may be changed at pleasure from one end of bar to the other, so as to be used in driving each way. These plows, to furrow out ground with, may be raised on the same principle as above described.

Having thus fully described my invention, what I claim as new, and desire to secure by Letters Patent, is—

1. The arrangement of the pedal R and hinged door P for opening and closing the seed-box J, substantially as herein set forth.

2. The arrangement of frame A, standards G G, and cross-bar H with the crank-wheel I, pawl $g$, cord $e$, bar E, chains $b\ b$, arm $h$, rock-shaft E, and catch K, for the purpose of adjusting the cultivator-beams C C, substantially as set forth.

In testimony that I claim the foregoing as my own I affix my signature in presence of two witnesses.

MICHAEL BAER.

Witnesses:
 FRANK S. CROCKETT,
 CHARLES B. LASSELLE.